Patented Aug. 22, 1950

2,519,764

UNITED STATES PATENT OFFICE 2,519,764

ESTERS OF MALEIC ACID

Ralph A. Jacobson, Landenberg, Pa., assignor to E. I. du Pont de Nemours & Company, Wilmington, Del., a corporation of Delaware No Drawing. Application July 9, 1945, Serial No. 604,087

12 Claims. (Cl. 154—43)

This invention relates to new artificial resins and more particularly refers to allyl alkyl esters of copolymers of maleic acid with polymerizable vinyl compounds which have been found to be of particular value as finishes, adhesives and laminating compositions.

Copolymers of maleic acid derivatives with vinyl monomers are well known in the art. Those in which the vinyl monomer is an ethenoid hydrocarbon or a vinyl carboxylate are usually brittle, low melting, and difficultly soluble in common organic solvents. As a result, they are of insignificant value in the field of finishes, adhesives and laminating compositions.

An object of this invention is to produce maleic acid copolymers which are not subject to the difficulties referred to heretofore. A further object is to provide maleic acid copolymers suitable for laminating compositions, adhesives and synthetic resin finishes. A still further object is to produce a class of maleic acid copolymer resins which are soluble in common lacquer solvents. A still further object is to produce soluble maleic acid copolymers capable of undergoing thermosetting under the influence of heat and appropriate catalysts. Additional objects will become apparent from a consideration of the following description and claims.

The above and other objects are accomplished by the production of copolymers of maleic anhydride with polymerizable monovinyl compounds followed by esterification of the copolymer in part with a saturated monohydric alcohol and in part with an unsaturated monohydric alcohol. In a more restricted sense this invention is concerned with a class of synthetic resins produced by the copolymerization of maleic acid and one or more polymerizable vinyl compounds, followed by partial esterification of the resulting copolymer with an alkenol of 3–4 carbon atoms having the ethylenic group removed from the hydroxyl group by one carbon atom, which in turn is followed by esterification of substantially all the remaining carboxyl groups with a straight chain normal alkanol of 6–8 carbon atoms. In its preferred embodiments the foregoing processes are carried out employing a monomeric vinyl compound, copolymers having a ratio of maleic groups to vinyl groups of 1 to 1, and amounts of esterifying agents which produce in the resulting copolymer unsaturated and saturated alkyl groups within the range from 1/1 to 1/3, respectively. The preferred unsaturated alkenol is allyl alcohol and the preferred saturated alkanol is hexanol.

In accordance with this invention the desired class of synthetic resins is prepared by esterifying an appropriate maleic anhydride copolymer in two steps: first, with an unsaturated alcohol, preferably allyl alcohol, and second, with a long chain saturated aliphatic alcohol, preferably hexyl alcohol. A mineral acid catalyst is advisably employed for the esterification. The resulting esterified copolymer solution is valuable for many purposes, as such. In general, however, it is preferred to remove the solvent from the solution by evaporation in order to recover the solid resin. This resin can then be dissolved in suitable inert organic solvents and employed either alone or in the presence of organic peroxides for coatings, laminations, castings, etc. In one of its preferred embodiments the solid resin is dissolved in a polymerizable monomer such as styrene, which serves both as a combination solvent and a reactant for the preparation of laminations and castings. On subjecting the final products to suitable conditions of temperature and pressure they become insoluble and infusible.

The invention may be more readily understood by a consideration of the following illustrative examples wherein the quantities are stated in parts by weight.

Example 1

115.8 parts 2/1/1 maleic anhydride/vinyl acetate/styrene copolymer
520 parts toluene
34.8 parts allyl alcohol
3 parts NaHSO$_4$ The above ingredients were heated at toluene reflux temperature in a 3-necked flask provided with a mercury-sealed stirrer, and a condenser to which was attached a water separator. In half an hour the mixture became gummy and stopped the stirrer. Heating was continued for another half hour without stirring (total 1 hr.) and 61.2 parts of n-hexanol was added. The gum started to dissolve and gradually went into solution. Heating was discontinued after a total of 26 hrs. 10.1 parts of water had collected in the separator. The mixture was poured into a tray and evaporated at 60° C. for 72 hrs. in a vacuum oven. A brown resin weighing 189 parts was obtained. The resin was somewhat pliable.

A laminating composition was prepared as follows: A mixture of 30 parts of the above resin, 45 parts of styrene, 3 parts of hexanol, and 3.5 parts of benzoyl peroxide was tumbled in a vessel until solution of the resin was complete. The rather viscous resin solution in which the styrene represented 60% of the film-forming solids was used in the following lamination experiments:

A. On each of 4 layers of a glass fabric was brushed some of the laminating agent described in the preceding paragraph. The 4 layers were superimposed on each other and heated in a press at 1000 lbs./sq. in. according to the following schedule:

20 min. at 100° C.
10 min. at 120° C.
15 min. at 140° C.
15 min. at 160° C.

The finished laminate had been compacted to a sheet containing about 30% of the thermoset resin. The tensile strength of the sheet was 20,250 lbs./sq. in.

B. On each of 2 layers of a glass fabric was brushed some of the above laminating agent. One layer was placed over the other and heated without pressure for 1 hour at 125° C. The laminated specimen contained 47% of resin. The tensile strength of the laminate was 16,600 lbs./sq. in.

*Example 2*

124 parts of resin of 2/1/1 maleic anhydride/vinyl acetate/ethylene
520 parts toluene
23.2 parts allyl alcohol
3 parts NaHSO$_4$ The above ingredients were heated in the apparatus used in Example 1. In 2½ hrs. the mixture had become gummy and at this point 122.4 parts of n-hexanol was added. Refluxing was continued until the gum dissolved. A total of 17.8 parts of water was collected during the 27.5 hour run. The resin solution was poured into a tray and evaporated at 60° C. in a vacuum. A brown sticky resin weighing 223 parts (87%) was obtained.

A mixture of 50 parts of the above resin, 62.5 parts styrene and 5.63 parts of benzoyl peroxide was tumbled in a vessel until solution of the resin was complete. The rather viscous brown solution in which the styrene to resin ratio was 55.5/44.5 was used in the following laminations:

A. On each of 4 layers of a glass fabric was brushed some of the laminating composition described in the preceding paragraph. The 4 layers were superimposed and heated at 1000 lbs./sq. in. according to the heating schedule described in A of Example 1. An excellent laminated specimen was obtained containing 33.4% of binder. The tensile strength was 26,000 lbs./sq. in.

B. On each of 2 layers of a glass fabric was brushed some of the laminating composition described above and the 2 layers placed one over the other. The composition was heated for 1 hr. at 125° C. without pressure. A laminate containing 45.8% of binder was obtained. The tensile strength was 23,000 lbs./sq. in.

C. The experiment described in the preceding paragraph was repeated using 2 layers of rayon unidirectional fabric instead of the glass fabric. The laminate contained 41% of binder and had a tensile strength of 6800 lbs./eq. in.

*Example 3*

The maleic anhydride/vinyl acetate/styrene interpolymer of Example 1 was prepared by heating one mole each of vinyl acetate and styrene with two moles of maleic anhydride suspended in toluene at about 85° C. in the presence of 3% (based on the weight of monomers) of benzoyl peroxide.

*Example 4*

The maleic anhydride/vinyl acetate/ethylene of Example 2 was prepared by charging maleic anhydride and vinyl acetate (in amounts desired in the final polymer) in the pressure resistant container. Ethylene was introduced and the container heated to about 85° C. with the pressure of ethylene maintained at about 500 lbs./sq. in.

It is to be understood that the foregoing examples are representative merely of a few of the many practical embodiments of this invention. They may be varied widely with respect to the individual reactants, the amounts thereof and the conditions of reaction without departing from the scope of the invention.

In place of or in admixture with the allyl alcohol employed in the above examples any ethylenically unsaturated alcohol of 3–4 carbon atoms having the ethylenic group removed from the alcoholic hydroxyl by one carbon atom may be employed. These include methallyl alcohol and crotonyl alcohol. As a general rule, allyl alcohol is preferred for this purpose, particularly since it is readily available at moderate cost. It is also contemplated that other unsaturated monohydric alcohols may be employed for this purpose.

In place of or in addition to the n-hexanol other saturated monohydric alcohols may be employed, particularly those containing from 6–8 carbon atoms, such as n-heptanol and n-octanol. When alcohols of less than 6 carbon atoms or highly branched alcohols are employed it has been found that the resulting diester resin is, as a general rule, less soluble in such solvents as toluene or styrene, thereby reducing somewhat its value as a coating or laminating agent. On the other hand, when alcohols having more than 8 carbon atoms, such as lauryl alcohol, are used, the resulting resin is ordinarily more waxy and has less strength, which in turn reduces its value as a laminating agent or a coating. For these reasons, it is preferred to employ n-hexanol, n-heptanol and/or n-octanol as the alkanol esterifying agent.

Esterification may advisably be carried out in the presence of a small amount of a mineral acid such as sulfuric, phosphoric or hydrochloric acid. When small amounts of acid are used it is usually not necessary to remove the acid prior to use of the resin. However, if desired the acid can be removed by washing with water before the resin is dried. The esterification reaction usually requires about 15 to 20 hours, although longer or shorter periods may be employed. The time for this reaction can be readily ascertained by observing the rate of water formation, as shown in the examples.

In the examples the vinyl components of the copolymer have been selected from the group of ethylene, styrene and vinyl acetate. However, it should be understood that in place of or in addition to these monovinyl compounds any one or more polymerizable monovinyl components may be employed. Likewise, it is contemplated that partially polymerized vinyl compounds may be utilized. For optimum solubility and utility of the resin for coating, laminating or similar operations it is preferred to employ those vinyl compounds having a single $=C=CH_2$ group such as vinyl esters of saturated monocarboxylic acids, preferably containing less than 16 carbon atoms in the ester group, such as for instance, vinyl acetate, vinyl butyrate, etc. Other examples of the preferred class of vinyl compounds are olefinic hydrocarbons such as ethylene, styrene and styrenes having nuclear substitution of halogen or methyl groups for hydrogen. The preferred polymerizable vinyl compounds may be represented by the formula RCH=CH$_2$ where R is hydrogen, an aromatic radical or an aliphatic acyloxy radical.

As shown in the examples, a plurality of vinyl compounds may be used to form the maleic anhydride copolymer. The molar ratio of maleic derivative to the total of the vinyl compounds is 1 to 1 in the copolymer, even though different ratios are employed during polymerization. It is preferred that the monomers be present in amounts roughly equivalent to their proportion in the final copolymer, although, of course, gaseous monomers such as ethylene may be employed in larger quantities.

The soluble esters can be converted to insoluble, infusible films by the use of a peroxy compound and/or heat. As shown in the examples they may be used with a polymerizable monomer such as styrene for producing cast objects, laminated compositions, for structural and other uses, and protective films for metal, wood, plastic objects and the like.

The compositions of this invention possess characteristics which are a great improvement over those possessed by maleic acid copolymers of the prior art. The improvement in these characteristics is such that the new compositions hereof are of particular value in the field of finishes, adhesives and laminating compositions. By means of this invention a new class of synthetic resins having particularly desirable properties is made available. These resins may be produced from materials which can be purchased in large quantities and at moderate cost. Within the class of resins mentioned there is considerable latitude in selecting the raw materials and the conditions of reaction in order to produce products which have specific properties to an exceptional degree.

As many apparently widely different embodiments of this invention may be made without departing from the spirit and scope thereof, it is to be understood that the invention is not limited to the specific embodiments thereof except as defined in the appended claims.

I claim:

1. A process which comprises esterifying a copolymer of maleic anhydride and at least one polymerizable monovinyl compound, wherein the ratio of maleic groups to vinyl groups, is approximately 1 to 1, with an alkenol of 3–4 carbon atoms, having the ethylenic group removed from the hydroxyl group by one carbon atom, and a straight chain normal alkanol of 6–8 carbon atoms, the ratio of alkenol to alkanol being from 1/1 to 1/3.

2. A process according to claim 1 in which the copolymer is a copolymer of maleic anhydride, vinyl acetate and styrene, and in which the alkenol is allyl alcohol.

3. A process according to claim 1 in which the copolymer is a copolymer of maleic anhydride, vinyl acetate and ethylene, and in which the alkenol is allyl alcohol.

4. A process according to claim 1 in which the copolymer is a copolymer of maleic anhydride and styrene, and in which the alkenol is allyl alcohol.

5. A process of preparing resinous esters which comprises reacting a copolymer of maleic anhydride and at least one polymerizable monovinyl compound, wherein the ratio of maleic groups to vinyl groups is approximately 1 to 1, with an alkenol of 3 to 4 carbon atoms having the ethylenic group removed from the hydroxyl group by one carbon atom, the amount of said alkenol being equivalent to one-fourth to one-half of the maleic groups in the copolymer, and thereafter reacting the partially esterified copolymer with a straight chain normal alkanol of 6 to 8 carbon atoms in amount equivalent to the remaining unesterified carboxyl groups in the polymer.

6. A resinous ester prepared by reacting a copolymer of maleic anhydride and at least one polymerizable monovinyl compound, wherein the ratio of maleic groups to vinyl groups is approximately 1 to 1, with an alkenol of 3 to 4 carbon atoms having the ethylenic group removed from the hydroxyl group by one carbon atom, and with a straight chain normal alkanol of 6 to 8 carbon atoms, the ratio of alkenol to alkanol being from 1/1 to 1/3.

7. The resinous ester of claim 6 dissolved in styrene.

8. A resinous ester according to claim 6 wherein the copolymer is prepared from maleic anhydride, vinyl acetate and styrene and wherein the alkenol is allyl alcohol.

9. A resinous ester according to claim 6 wherein the copolymer is prepared from maleic anhydride, vinyl acetate and ethylene, and wherein the alkenol is allyl alcohol.

10. A resinous ester according to claim 6 wherein the copolymer is prepared from maleic anhydride and styrene, and wherein the alkenol is allyl alcohol.

11. A laminated article comprising a plurality of layers of fabric from the group consisting of glass fabric and rayon fabric, bonded together by means of a resinous ester prepared by reacting a copolymer of maleic anhydride and at least one polymerizable monovinyl compound, wherein the ratio of maleic groups to vinyl groups is approximately 1 to 1, with an alkenol of 3 to 4 carbon atoms having the ethylenic group removed from the hydroxyl group by one carbon atom, and with a straight chain normal alkanol of 6 to 8 carbon atoms, the ratio of alkenol to alkanol being from 1/1 to 1/3.

12. A laminated article comprising a plurality of layers of glass fabric bonded together by means of a bonding agent comprising styrene and a resinous ester prepared by reacting a copolymer of maleic anhydride and at least one polymerizable monovinyl compound, wherein the ratio of maleic groups to vinyl groups is approximately 1 to 1, with allyl alcohol and with a straight chain normal alkanol of 6 to 8 carbon atoms, the ratio of allyl alcohol to alkanol being from 1/1 to 1/3.

RALPH A. JACOBSON.

REFERENCES CITED

The following references are of record in the file of this patent:

UNITED STATES PATENTS

| Number | Name | Date |
|---|---|---|
| 2,062,917 | Lawson | Dec. 1, 1936 |
| 2,219,054 | Palm et al. | Oct. 22, 1940 |
| 2,254,382 | Neher | Sept. 2, 1941 |
| 2,273,891 | Pollack et al. | Feb. 24, 1942 |
| 2,306,071 | McNally et al. | Dec. 22, 1942 |
| 2,310,731 | D'Alelio | Feb. 9, 1943 |
| 2,320,724 | Gerhart et al. | June 1, 1943 |
| 2,375,516 | Blair | May 8, 1945 |
| 2,431,374 | D'Alelio | Nov. 25, 1947 |